US009357244B2

(12) United States Patent
Ben Yehuda et al.

(10) Patent No.: US 9,357,244 B2
(45) Date of Patent: May 31, 2016

(54) METHOD AND SYSTEM FOR INHIBITING AUDIO-VIDEO SYNCHRONIZATION DELAY

(75) Inventors: Raz Ben Yehuda, Rishon Le-Zion (IL); Yaron Presente, Binyamina (IL); Eran Maman, Bat Hefer (IL); Asaf Mozes, Netanya (IL); Ofer Kruzel, Haifa (IL)

(73) Assignee: ARRIS Enterprises, Inc., Suwanee, GA (US)

( * ) Notice: Subject to any disclaimer, the term of this patent is extended or adjusted under 35 U.S.C. 154(b) by 243 days.

(21) Appl. No.: 12/722,227

(22) Filed: Mar. 11, 2010

(65) Prior Publication Data

US 2011/0221959 A1 Sep. 15, 2011

(51) Int. Cl.
*H04N 7/173* (2011.01)
*H04N 21/236* (2011.01)
*H04N 21/2368* (2011.01)
*H04N 21/438* (2011.01)
*H04N 21/6405* (2011.01)
*H04N 21/6408* (2011.01)

(52) U.S. Cl.
CPC ..... *H04N 21/23608* (2013.01); *H04N 21/2368* (2013.01); *H04N 21/4384* (2013.01); *H04N 21/6405* (2013.01); *H04N 21/6408* (2013.01)

(58) Field of Classification Search
CPC ............ H04N 7/17318; H04N 21/235; H04N 21/435; H04N 7/165; H04N 7/173
USPC .................. 725/93–96, 116, 146; 375/240.28
See application file for complete search history.

(56) References Cited

U.S. PATENT DOCUMENTS

| | | |
|---|---|---|
| 5,361,091 A | 11/1994 | Hoarty et al. |
| 5,421,031 A | 5/1995 | De Bey |
| 5,528,282 A | 6/1996 | Voeten et al. |
| 5,532,748 A | 7/1996 | Naimpally |
| 5,633,683 A | 5/1997 | Rosengren et al. |
| 5,659,539 A | 8/1997 | Porter et al. |
| 5,682,597 A | 10/1997 | Ganek et al. |
| 5,684,799 A | 11/1997 | Bigham et al. |
| 5,686,965 A | 11/1997 | Auld |
| 5,701,582 A | 12/1997 | DeBey |
| 5,719,632 A | 2/1998 | Hoang et al. |
| 5,724,646 A | 3/1998 | Ganek et al. |
| 5,732,217 A | 3/1998 | Emura et al. |
| 5,748,229 A | 5/1998 | Stoker |
| 5,864,682 A | 1/1999 | Porter et al. |
| 5,884,141 A | 3/1999 | Inoue et al. |

(Continued)

FOREIGN PATENT DOCUMENTS

| | | |
|---|---|---|
| EP | 1487215 A2 | 12/2004 |
| EP | 1523190 A1 | 4/2005 |

(Continued)

OTHER PUBLICATIONS

Rajah, Rajesh, "Optimizing Channel Change Time", Cisco Systems, Inc., NAB Show. 2008. URL: http://www.teamlightbulb.com/Rajah%20Cisco.pdf.

(Continued)

*Primary Examiner* — Jason Salce
(74) *Attorney, Agent, or Firm* — Stewart M. Wiener (57) ABSTRACT

A method for urging the start of viewing an interleaved audio video stream is disclosed. The method includes repositioning audio and video access units in the interleaved audio video stream. A computer program product and a data processing system are also disclosed.

20 Claims, 4 Drawing Sheets

(56) References Cited

U.S. PATENT DOCUMENTS

| | | | |
|---|---|---|---|
| 5,909,224 A * | 6/1999 | Fung | 345/531 |
| 5,933,193 A | 8/1999 | Niesen | |
| 5,949,410 A * | 9/1999 | Fung | 715/203 |
| 6,112,226 A | 8/2000 | Weaver et al. | |
| 6,138,147 A | 10/2000 | Weaver et al. | |
| 6,181,334 B1 | 1/2001 | Freeman et al. | |
| 6,310,652 B1 | 10/2001 | Li et al. | |
| 6,317,459 B1 | 11/2001 | Wang | |
| 6,334,217 B1 | 12/2001 | Kim | |
| 6,415,326 B1 | 7/2002 | Gupta et al. | |
| 6,480,539 B1 | 11/2002 | Ramaswamy | |
| 6,510,177 B1 | 1/2003 | De Bonet et al. | |
| 6,519,011 B1 | 2/2003 | Shendar | |
| 6,519,693 B1 | 2/2003 | Debey | |
| 6,526,580 B2 | 2/2003 | Shimomura et al. | |
| 6,535,920 B1 | 3/2003 | Parry et al. | |
| 6,611,624 B1 | 8/2003 | Zhang et al. | |
| 6,637,031 B1 | 10/2003 | Chou | |
| 6,728,317 B1 | 4/2004 | Demos | |
| 6,745,715 B1 | 6/2004 | Shen et al. | |
| 6,771,644 B1 | 8/2004 | Brassil et al. | |
| 6,850,965 B2 | 2/2005 | Allen | |
| 6,870,887 B2 | 3/2005 | Kauffman et al. | |
| 6,985,570 B2 | 1/2006 | Hasemann | |
| 7,058,721 B1 | 6/2006 | Ellison et al. | |
| 7,096,481 B1 | 8/2006 | Forecast et al. | |
| 7,116,714 B2 | 10/2006 | Hannuksela | |
| 7,143,432 B1 | 11/2006 | Brooks et al. | |
| 7,149,410 B2 | 12/2006 | Lin et al. | |
| 7,164,714 B2 | 1/2007 | Martin | |
| 7,218,635 B2 | 5/2007 | Haddad | |
| 7,298,966 B2 | 11/2007 | Nakatani et al. | |
| 7,366,241 B2 | 4/2008 | Matsui | |
| 7,369,610 B2 | 5/2008 | Xu et al. | |
| 7,430,222 B2 | 9/2008 | Green et al. | |
| 7,444,419 B2 | 10/2008 | Green | |
| 7,469,365 B2 | 12/2008 | Kawahara et al. | |
| 7,472,197 B2 * | 12/2008 | Li | H04L 29/06027 370/486 |
| 7,493,644 B1 * | 2/2009 | Tanskanen | 725/62 |
| 7,562,375 B2 | 7/2009 | Barrett et al. | |
| 7,587,737 B2 | 9/2009 | Baldwin et al. | |
| 7,636,934 B2 | 12/2009 | Baldwin et al. | |
| 7,720,432 B1 | 5/2010 | Colby et al. | |
| 7,788,393 B2 | 8/2010 | Pickens et al. | |
| 7,885,270 B2 | 2/2011 | Frink et al. | |
| 2002/0016961 A1 | 2/2002 | Goode | |
| 2002/0073402 A1 | 6/2002 | Sangavarapu et al. | |
| 2002/0147979 A1 | 10/2002 | Corson | |
| 2002/0166119 A1 | 11/2002 | Cristofalo | |
| 2002/0168012 A1 | 11/2002 | Ramaswamy | |
| 2002/0184637 A1 | 12/2002 | Perlman | |
| 2003/0012280 A1 | 1/2003 | Chan | |
| 2003/0053476 A1 | 3/2003 | Sorenson et al. | |
| 2003/0093543 A1 | 5/2003 | Cheung et al. | |
| 2003/0098869 A1 | 5/2003 | Arnold et al. | |
| 2003/0103613 A1 | 6/2003 | Hasemann | |
| 2003/0128765 A1 | 7/2003 | Yoshigahara | |
| 2003/0208768 A1 | 11/2003 | Urdang et al. | |
| 2004/0034863 A1 | 2/2004 | Barrett et al. | |
| 2004/0034864 A1 | 2/2004 | Barrett et al. | |
| 2004/0049793 A1 | 3/2004 | Chou | |
| 2004/0064497 A1 | 4/2004 | Debey | |
| 2004/0146205 A1 | 7/2004 | Becker et al. | |
| 2004/0160974 A1 | 8/2004 | Read et al. | |
| 2004/0223739 A1 | 11/2004 | Suzuki et al. | |
| 2004/0231004 A1 | 11/2004 | Seo | |
| 2004/0255328 A1 | 12/2004 | Baldwin et al. | |
| 2005/0039219 A1 * | 2/2005 | Cooper et al. | 725/134 |
| 2005/0055730 A1 | 3/2005 | Daniels | |
| 2005/0060755 A1 | 3/2005 | Daniels | |
| 2005/0060756 A1 | 3/2005 | Daniels | |
| 2005/0081244 A1 | 4/2005 | Barret et al. | |
| 2005/0089035 A1 | 4/2005 | Klemets et al. | |
| 2005/0097596 A1 | 5/2005 | Pedlow | |
| 2005/0099869 A1 | 5/2005 | Crinon et al. | |
| 2005/0120131 A1 | 6/2005 | Allen | |
| 2005/0135477 A1 | 6/2005 | Zhang et al. | |
| 2005/0174352 A1 | 8/2005 | Gabrani et al. | |
| 2005/0190781 A1 | 9/2005 | Green et al. | |
| 2005/0210145 A1 | 9/2005 | Kim et al. | |
| 2005/0232587 A1 | 10/2005 | Strawn et al. | |
| 2005/0254649 A1 | 11/2005 | Demos | |
| 2005/0262531 A1 | 11/2005 | Varma et al. | |
| 2005/0265374 A1 | 12/2005 | Pelt | |
| 2006/0018379 A1 | 1/2006 | Cooper | |
| 2006/0020995 A1 | 1/2006 | Opie et al. | |
| 2006/0075428 A1 | 4/2006 | Farmer et al. | |
| 2006/0075446 A1 | 4/2006 | Klemets et al. | |
| 2006/0075449 A1 | 4/2006 | Jagadeesan et al. | |
| 2006/0080724 A1 | 4/2006 | Vermeiren et al. | |
| 2006/0083263 A1 | 4/2006 | Jagadeesan et al. | |
| 2006/0117358 A1 | 6/2006 | Baldwin et al. | |
| 2006/0117359 A1 | 6/2006 | Baldwin et al. | |
| 2006/0126667 A1 * | 6/2006 | Smith et al. | 370/486 |
| 2006/0136581 A1 * | 6/2006 | Smith | 709/224 |
| 2006/0143669 A1 | 6/2006 | Cohen | |
| 2006/0182052 A1 | 8/2006 | Yoon et al. | |
| 2006/0184973 A1 | 8/2006 | de Heer et al. | |
| 2006/0218281 A1 | 9/2006 | Allen | |
| 2006/0224666 A1 | 10/2006 | Allen | |
| 2006/0224768 A1 | 10/2006 | Allen | |
| 2006/0242240 A1 | 10/2006 | Parker et al. | |
| 2006/0244936 A1 | 11/2006 | Ozawa | |
| 2006/0262985 A1 | 11/2006 | Chen et al. | |
| 2007/0009039 A1 | 1/2007 | Ryu | |
| 2007/0040818 A1 | 2/2007 | Aoyanagi et al. | |
| 2007/0107026 A1 | 5/2007 | Sherer et al. | |
| 2007/0121629 A1 | 5/2007 | Cuijpers et al. | |
| 2007/0126853 A1 | 6/2007 | Ridge et al. | |
| 2007/0130596 A1 | 6/2007 | Wirick | |
| 2007/0133609 A1 | 6/2007 | Moore et al. | |
| 2007/0222728 A1 | 9/2007 | Koyama et al. | |
| 2007/0230564 A1 | 10/2007 | Chen et al. | |
| 2007/0266398 A1 | 11/2007 | Vandaele | |
| 2007/0280298 A1 | 12/2007 | Hearn et al. | |
| 2007/0280354 A1 | 12/2007 | Park et al. | |
| 2008/0028275 A1 | 1/2008 | Chen et al. | |
| 2008/0109557 A1 | 5/2008 | Joshi et al. | |
| 2008/0120553 A1 | 5/2008 | Bergman et al. | |
| 2008/0127258 A1 | 5/2008 | Walker et al. | |
| 2008/0273698 A1 | 11/2008 | Manders et al. | |
| 2009/0010273 A1 | 1/2009 | Green et al. | |
| 2009/0064242 A1 | 3/2009 | Cohen et al. | |
| 2009/0077255 A1 | 3/2009 | Smith et al. | |
| 2009/0198827 A1 | 8/2009 | Hughes | |
| 2009/0245393 A1 | 10/2009 | Stein et al. | |
| 2009/0307732 A1 | 12/2009 | Cohen et al. | |
| 2009/0322962 A1 | 12/2009 | Weeks | |
| 2010/0254673 A1 * | 10/2010 | Begen | H04N 7/17318 386/239 |
| 2010/0293587 A1 * | 11/2010 | Haimi-Cohen | H04L 12/185 725/120 |
| 2011/0072463 A1 | 3/2011 | Zaslavsky et al. | |
| 2011/0162024 A1 | 6/2011 | Jagadeesan et al. | |

FOREIGN PATENT DOCUMENTS

| | | |
|---|---|---|
| EP | 1294193 B1 | 6/2010 |
| KR | 10-2006-0110104 A | 10/2006 |
| WO | 2004114667 A1 | 12/2004 |
| WO | 2004114668 A1 | 12/2004 |
| WO | 2008044916 A2 | 4/2008 |
| WO | 2009097230 | 8/2009 |
| WO | 2010014210 | 2/2010 |

OTHER PUBLICATIONS

Johns, Warren, "A Better TV Experience with Microsoft Mediaroom Instant Channel Change", OpsVault.com, Sep. 29, 2010. URL: http://www.opsvault.com/a-better-tv-experience-with-microsoft-mediaroom-instant-channel-change/.

PCT International Search Report for PCT/US2001/027846, dated Jun. 21, 2011.

(56) References Cited

OTHER PUBLICATIONS

Hurst et al., "MPEG Splicing; A New Standard for Television—SMPTE312M", SMPTE Journal, vol. 107, No. 11. Nov. 1, 1998.

Wee, S.J. et al., "Splicing MPEG Video Streams in the Compressed Domain", Hewlett Packard Laboratories, Jun. 23, 1997.

American National Standard ANSI/SCTE 35 2004, "Digital Program Insertion Cueing Message for Cable," Society of Cable Telecommunications Engineers, Inc., Exton, PA, USA (www.scte.org).

Azad, S.A., et al., "A novel batched multicast patching scheme for video broadcasting with low user delay," Signal Processing and Information Technology, 2003. ISSPIT 2003. Proceedings of the 3rd IEEE International Symposium on Darmstadt, Germany, pp. 339-342 (2003).

Chiariglione, L., "Short MPEG-2 description," accessed at http://web.archive.org/web/20101010044824/http://mpeg.chiariglione.org/standards/mpeg-2/mpeg-2.htm, accessed on Dec. 20, 2012, 4 pages.

Oliver, M., Tutorial: The H.264 Scalable Video Codec (SVC), accessed at http://www.eetimes.com/design/signal-processing-dsp/4017613/Tutoriai-The-H-264-Scalable-Video-Codec-SVC, accessed on Mar. 10, 2008, 2 pages.

Poon, W-F., et al. "Batching policy for video-on-demand in multicast environment," Electronics Letters, IEEE ,vol. 36, No. 15, pp. 1329-1330 (2000).

Schulzrinne, H., et al., "Real-Time Streaming Protocol (RTSP)," Request for Comments RFC2326, Network Working Group, pp. 1-92, The Internet Society (1998).

Wave 7 Optics, Inc., "Channel Change Speed in IPTV Systems," White Paper, dated Jun. 3, 2004.

Zhu, X., et al., "Video Multicast over Wireless Mesh Networks with Scalable Video Coding (SVC)," Visual Communications and Image Processing, Proceedings of the SPIE, vol. 6822, pp. 682205-682205-8 (2008).

Office Action Issue to Canadian Application #2,792,106; dated Sep. 29, 2014.

\* cited by examiner

METHOD AND SYSTEM FOR INHIBITING AUDIO-VIDEO SYNCHRONIZATION DELAY

BACKGROUND OF THE INVENTION

The present invention relates to digital television. More particularly the present invention relates to method and system for inhibiting audio-video synchronization delay, for fast initiation of display of interleaved video and audio by a decoder, suitable, for example, for fast channel switching between channels broadcasting interleaved video and audio data.

Television (TV) viewers often switch between broadcast channels (sometimes this action is named "zapping"). In past days of analogue TV the response to a switching command (input directly or using a handheld remote control) was practically immediate.

Digital Television (DTV) technology has introduced new benefits and challenges, but channel switching involves delays.

Broadcast channel switching in the DTV realm is implemented, for example, in Internet Protocol (IP) networks using a multicast Internet Group Management Protocol (IGMP) and by Switch Digital Broadcast (SDB) in Hybrid Fiber Coax (HFC) networks. The switched broadcast concept, both in IP and HFC networks, introduces a delay in reception of the newly switched channel as data is forwarded to the receiver.

DTV is closely associated with compression of video. In some compressed video formats, such as for example, in the MPEG format, a Video Elementary Stream (VES) is subjected to GOP (Group Of Pictures) encoding. To deal with temporal redundancy, MPEG divides the frames into groups, each referred to as a "group of pictures," or GOP. A VES is made up of I, P and B type pictures. An I picture (I stands for Intracoded picture) contains information of a whole new frame and is used as reference in the reconstruction of either P or B pictures, whereas a P (P stands for Predicted picture) picture contains information on several consecutive intermediate frames sharing information from the I picture. A P picture supports forward prediction from a previous picture. A B picture (B stands for Bi-directional prediction picture) contains only information of a single intermediate frame. A B picture is a forward, backward or bi-directional picture, referring to other I and P pictures.

Due to the abovementioned video compression characteristics start of playback is possible only at specific points along the compressed video stream, when an intra-coded picture (I picture) is received, otherwise motion estimation dependent information will be lost, causing artifact macro blocks to appear on the screen.

The GOP structure that only allows starting playback at the beginning of a GOP introduces a delay in a channel change operation (so-called "zapping") due to the fact that the decoder has to wait for the beginning of a GOP to be received before it can start playback. The average delay is half the GOP size, which typically spans a few seconds. The better the compression is the longer the GOP size, introducing greater channel change delays.

In addition to the delay caused by the GOP structure, there is an additional delay introduced in the multiplexing process. The multiplexer typically generates an interleaved video and audio stream, with synchronized video and audio. The multiplexer refers to the atomic component consisting of video picture and audio signal as Access Unit (AU), a different name may be used to describe an atomic component with reference to different video-audio formats. For brevity the term "access unit" is used in the present application to refer to any such atomic component.

The multiplexing process takes into account the fact that compressed video picture size varies, thus the multiplexer generates a video buffer to cope with picture size variations. On the other hand audio may be characterized by a constant bitrate and does not require a large buffer compared to video. As a result, audio AUs in the interleaved video and audio data are delayed until the video buffer is full enough. When the de-multiplexer at the end-user playback device starts de-multiplexing the interleaved stream, it must wait until the audio information corresponding to the already-received video pictures arrives, and only then the matched video and audio data can be forwarded to the video and audio decoders. The described process introduces addition delay called Audio/Video synchronization delay (or A/V synch delay for short) delay. The A/V synch delay may reach a few seconds.

A known approach to solving the A/V synch delay is based on full transcoding of the entire stream. This approach tries to reduce picture size variation attributed to encoding so as to reduce the required video buffer, and by that reducing the delay between the corresponding video and audio data.

Another approach to solve the A/V synch delay is based on playing the video in slow motion to allow the audio information to catch up with the video information, until audio and video are synchronized. This method enables the video buffer to be filled while video is immediately shown on screen in slow motion.

BRIEF DESCRIPTION OF THE INVENTION

There is thus provided, according to embodiments of the present invention, a method for urging the start of display of an interleaved audio-video data. The method includes repositioning audio or video access units in the interleaved audio video data prior to providing the interleaved audio-video data to a decoder.

Furthermore, in accordance with embodiments of the present invention, the method includes repositioning audio access units closer to video access units that correlate in time to the repositioned audio access units.

Furthermore, in accordance with embodiments of the present invention, the method includes repositioning video access units closer to audio access units that correlate in time to the repositioned video access units.

Furthermore, in accordance with embodiments of the present invention, the method further includes providing interleaved audio-video data to a decoder at a rate which is faster than a nominal rate of the interleaved audio-video data.

Furthermore, in accordance with embodiments of the present invention, the method includes discarding audio access units or video access units from the interleaved audio-video data, by performing an action selected from the group of actions consisting of: rewriting over, silencing and removing.

Furthermore, in accordance with embodiments of the present invention, the method is used for switching between a first channel and a second channel of a multicast service of which the second channel transmits the interleaved audio video data. The method includes transmitting the repositioned interleaved audio video stream of the second channel in a unicast mode for a determined period of time before reconnecting to the multicast service.

Furthermore, in accordance with embodiments of the present invention, the method includes accelerating the interleaved audio video stream of the second channel in a unicast mode until the accelerated stream catches up with the second channel of the multicast service.

Furthermore, in accordance with embodiments of the present invention, there is provided a computer program product stored on a non-transitory tangible computer readable storage medium for urging the start of viewing an interleaved audio video stream. The computer product includes computer useable program code for repositioning audio and video access units in the interleaved audio video stream.

Furthermore, in accordance with embodiments of the present invention, there is provided a data processing system. The system includes: a processor; a computer usable medium connected to processor, wherein the computer usable medium contains a set of instructions for urging the start of viewing an interleaved audio video stream, wherein the processor is adapted to carry out a set of instructions to reposition audio and video access units in the interleaved audio video stream.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operation herein. This apparatus may be specially constructed for the desired purposes, or it may comprise a general-purpose computer device selectively activated or reconfigured by a computer program stored in the device. Such a computer program may be stored in a computer non-transitory tangible computer readable storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing electronic instructions and capable of being coupled to a computer system bus.

Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of embodiments of the invention as described herein.

It should be appreciated that according to some embodiments of the present invention, the method described below, may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

The method may be provided as a computer program product that may include a machine-readable medium having stored thereon instructions that may be used to program a computer (or other electronic devices) to perform the method. For the purposes of this specification, the terms "computer readable media" may include any medium that is capable of storing or encoding a sequence of instructions for execution by the computer and that cause the computer to perform any one of the methodologies of the present invention. The term "computer-readable media" may accordingly include, but not limited to, solid-state memories, optical and magnetic disks, and a carrier wave that encodes a data signal.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that the present invention may be used in a variety of applications.

The term "interleaved audio video stream" is understood, in the context of the present specification, to mean a data stream that includes both video and audio access units, unless specifically stated otherwise.

According to embodiments of the present invention it is suggested to address the A/V sync delay by providing the interleaved video and audio in a unicast mode with brief re-multiplexing at the beginning of the interleaved video and audio data. In addition, the compressed interleaved audio video data at a channel switching server may be accelerated for a short period of unicast transmission in the beginning of the stream. By "accelerating" is meant providing interleaved audio-video data to the decoder at a rate which is faster than the nominal rate of the interleaved audio-video data.

The re-multiplexing process repositions audio and video access units. According to embodiments of the present invention, the repositioning of the audio and video AUs includes repositioning of audio AUs closer to one or more video AUs in the beginning of the unicast stream, thus eliminating or at least greatly reducing the time needed for the decoder to get the audio AUs, so as to facilitate immediate or nearly immediate rendering. As a result of re-multiplexing at the beginning of the interleaved stream audio AUs are available immediately or nearly immediately next to the first video AU, thus the A/V synch delay is eliminated.

In other embodiments of the present invention video AUs may be repositioned (although in accordance with present interleaved audio-video data formats it is more likely that audio AUs be repositioned).

Since the re-multiplexing process is applied only to the beginning of the stream at a channel change server, additional equipment may not be required.

As opposed to the full transcoding solution, according to embodiments of the present invention the broadcasted data is not broadcasted through the channel change server, but rather only an initial unicast phase is transmitted from the channel change server, and then normal broadcast process continues. This approach provides higher availability of the system and the broadcast is not substantially affected by the channel change equipment.

As re-multiplexing is a process which does not use heavy processing resources, no, or negligible, performance penalty is involved.

According to embodiments of the present invention no video artifacts are present, such as slow motion, which may cause leaps and synchronization problems.

According to embodiments of the present invention, when a viewer of a multicast service switches from a first channel to a second channel, a period of accelerated unicast transmission is applied in the beginning of the stream of the second channel. A short re-multiplexing of the beginning of the accelerated unicast interleaved stream is applied. The re-multiplexing process re-positions some audio AUs earlier in the stream, for example right after the first video packet. The re-multiplexing process re-positions the audio AU corresponding to the first video AU right after the first video AU. Any audio AU that exist in the stream earlier then the first corresponding audio AU are either re-written with the re-positioned audio AU or silenced by change of the Packet Identifier (PID) to NULL PID. The re-positioning process does not add any new data to the stream, just relocated data segments within the stream. The re-positioning of the audio AU is done without changing their timing information. Audio AU are re-positioned earlier in the stream such that the acceleration compensates for the earlier re-positioning in terms of audio AU arrival rate while maintaining AU original arrival rate as in the original un accelerated multiplexed stream.

As a result of the re-multiplexing according to embodiments of the present invention, video AU may be forwarded to the video decoder buffer in an accelerated rate, which may require a larger video decoder buffer then originally defined by the multiplexer.

Reference is now made to the accompanying figures.

Figure 1:
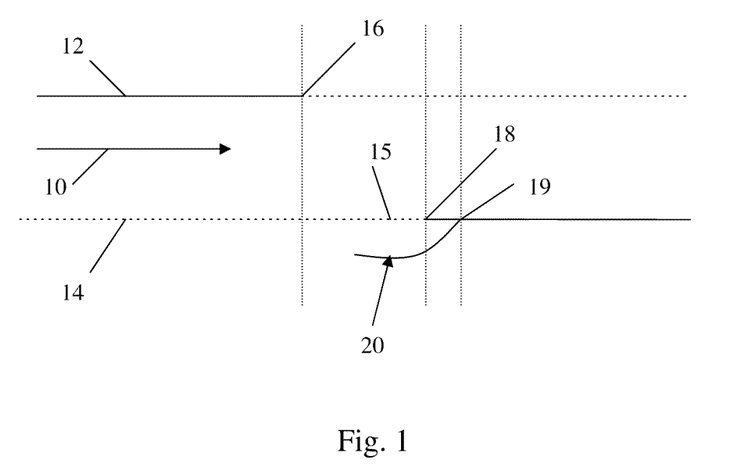
FIG. 1 is a diagram illustrating switching viewing between two channels of a multicast transmission, according to embodiments of the present invention.

FIG. 1 is a diagram illustrating switching viewing between two channels of a multicast transmission, according to embodiments of the present invention. The multicast transmission includes two channels 12, 14 (arrow 10 indicating the direction of advance of time). A viewer initially watches channel 12 and at a certain point in time 16 activates a channel switch command (e.g. zaps channels using a remote control or using operation keys of his STB).

Currently, due to the imposed delays the play of channel 14 will commence on the viewers machine only at time 18, due to the inherent delay (A/V sync delay and GOP delay), so that portion 15 of the transmission of channel 14, which was transmitted after the channel switch command, will not be presented to the viewer to watch.

According to embodiment of the present invention it is suggested to address the A/V sync delay by providing to the viewer's de-multiplexer an accelerated unicast transmission of the a beginning portion of the video stream of the second channel (channel 14), which was already transmitted in the multichast after the switch command, while repositioning of audio Aus closer to the beginning of the accelerated unicast stream, until audio re-positioning is not required any more, as the calculated new audio AU position matches the original position. The re-positioning is calculated to end till the unicast transmission is finished. At this stage normal multicast reception of the second channel to the viewer's de-multiplexer is continued.

Figure 2:
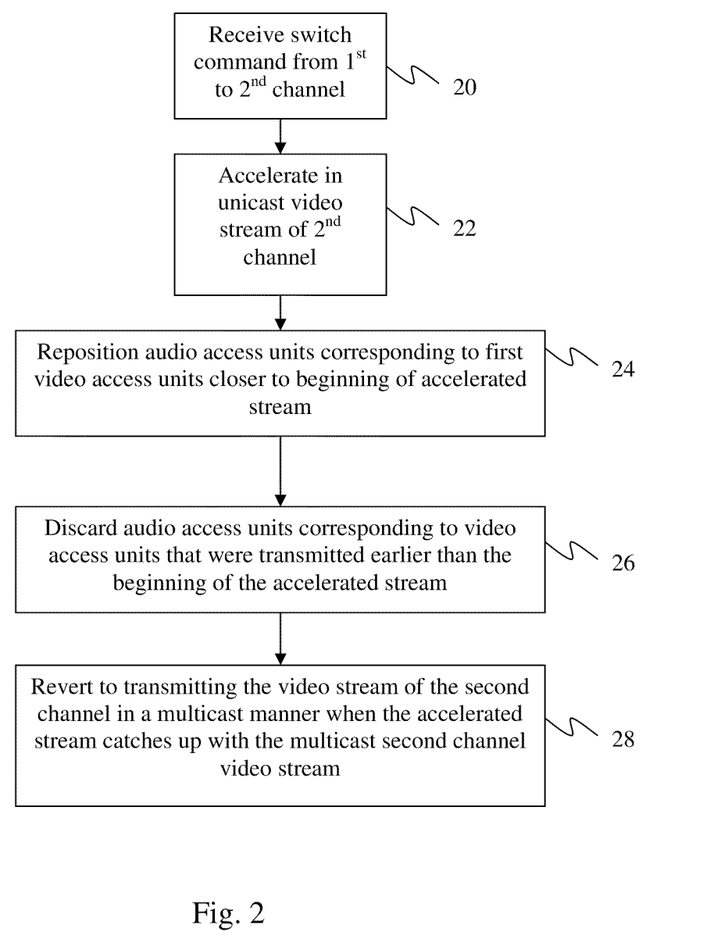
FIG. 2 illustrates a method for switching between two multicast channels, according to embodiments of the present invention.

FIG. 2 illustrates a method for switching between two multicast channels, according to embodiments of the present invention.

The method starts when a switch command to switch from a first to a second channel, of a multicast service, is received 22 at a channel switch server (a channel switch server may be realized in software, hardware of a combination of both). In response the channel switch server Accelerate in unicast video stream of $2^{nd}$ channel 22, while repositioning audio access units corresponding to first video access units of the accelerated stream closer to the beginning of the stream 24. In this process audio access units which correspond to video access units that were transmitted earlier than the beginning of the accelerated stream are discarded 26. When the accelerated stream catches up with the multicast second channel video stream multicast reception is reestablished (reverted to) 28.

Figure 3:
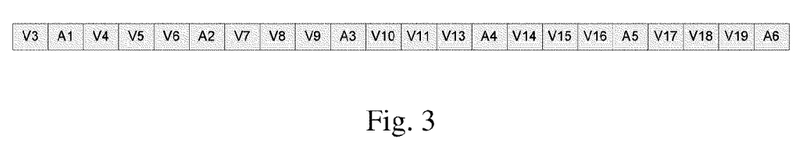
FIG. 3 depicts the structure of a typical interleaved audio and video stream (prior art)

FIG. 3 (PRIOR ART) shows a packetized interleaved stream before the application of the audio Aus re-positioning according to embodiments of the present invention. Each block represent video packet by $V_i$, and audio packet by $A_i$ (i being an integer, representing the position of that packet in the stream, or, in other words, the timing of that packet in the sequence).

Figure 4:
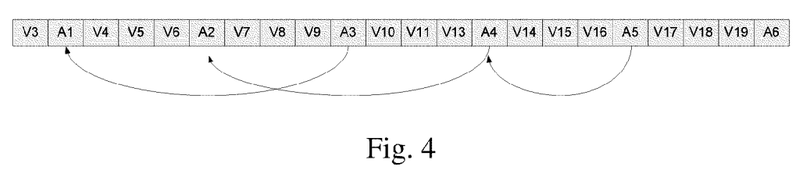
FIG. 4 depicts re-arranging of audio and video packets in an interleaved audio and video stream as applied by a re-multiplexing algorithm, in accordance with embodiments of the present invention.

FIG. 4 shows the re-positioning operations applied to audio packets in the accelerated multicast stream, according to embodiments of the present invention. In the example shown in this figure audio packet $A_3$ is repositioned to replace audio packet $A_1$, audio packet $A_4$ is repositioned to replace audio packet $A_2$ and audio packet $A_5$ is repositioned to replace audio packet $A_4$.

Figure 5:
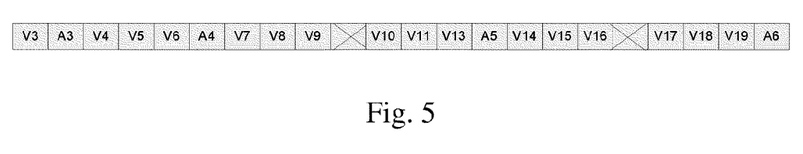
FIG. 5 shows the stream after re-multiplexing, according to embodiments of the present invention.

FIG. 5 shows the stream after re-multiplexing, according to embodiments of the present invention. As seen from FIG. 5, after re-multiplexing, the corresponding video and audio packets $V_1$ and $A_1$ are located in close proximity, and the de-multiplexer can forward both $V_1$ and $A_1$ to the decoder, to start decoding and rendering to video and audio streams. Note that some audio packets have changed their location (repositioned closer to the beginning of the stream, while others have been removed (crossed cells, in the old positions of $A_3$ and $A_5$) or written over ($A_3$ over $A_1$, $A_4$ over $A_2$ and $A_5$ over $A_4$).

Figure 6:
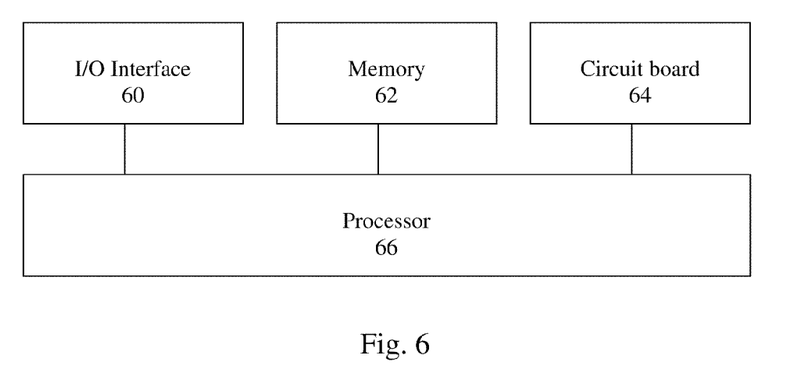
FIG. 6 illustrates a computing device for switching between two multicast channels, according to embodiments of the present invention.

FIG. 6 illustrates a computing device for switching between two multicast channels, according to embodiments of the present invention. The device includes a circuit board 64, memory 62, input/output (I/O) interface 60 and processor

66. A computer executable program which includes instructions to perform method steps according to embodiments of the present invention may be stored on memory 62 and executed by processor 66.

Figure 7:
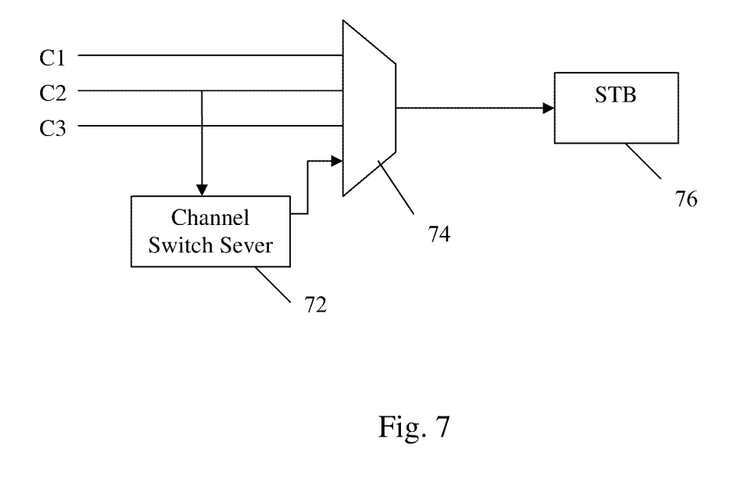
FIG. 7 illustrates a scheme of a channel change server, according to embodiments of the present invention.

FIG. 7 illustrates a scheme of a multicast design with a channel change server, according to embodiments of the present invention. A multicast transmission (depicted as three channels C1, C2 and C2) is provided to router or Digital Subscriber Line Access Multiplexer (DSLAM) 74. When the end user chooses to switch viewing from one channel to another (e.g. from channel 1 to channel 2) channel switch server 72 performs repositioning of audio and video access units according to embodiments of the present invention and the repositioned interleaved video stream in a unicast mode to the user's set-top-box (STB) 76 for a determined period of time (e.g. until the unicast stream catches up with the second channel of the multicast service, and then multicast mode is resumed.

An algorithm (presented here as a pseudo-code) for re-multiplexing an audio and video stream, according to embodiments of the present invention, may include the following steps:

```
Set video_buffer_size = original video_buffer_size * (1+ acceleration_factor)
Locate first playable video AU (I picture).
Set first_i_dts to the first video AU dts.
Locate first audio packet that its dts >=first_i_dts.
Set future_aud_pkt [audio pid] to this packet (for all audio streams).
For each audio_pkt[pid] //audio packet of any audio pid
    if (audio_pkt[pid] ==future_aud_pkt[pid] ) { //done re-positioning this pid
        if all (audio__pkt[pid] >= future__aud__pkt[pid])
                         exit loop
        else
   loop
        }
    if (audio_buffer_size[pid] < max_audio_buffer_size[pid]) {
        replace audio_pkt[pid] with future_aud_pkt[pid]
        set future_aud_pkt[pid] to audio packet next after future_aud_pkt[pid]
    // add audio packet in (nominal + acceleration_factor) rate
    // remove audio packet in nominal rate
    audio_buffer_size[pid] +=audio_pkt _size[pid] * acceleration_factor
}
    else {
        set packet as NULL, by changing pid number to NULL pid
        }
Loop
```

* dts-decoding time stamp

It should be clear that the description of the embodiments and attached Figures set forth in this specification serves only for a better understanding of the invention, without limiting its scope.

It should also be clear that a person skilled in the art, after reading the present specification could make adjustments or amendments to the embodiments described herein that would still be included in the scope of the present invention.

What is claimed is:

1. A method for accelerating the start of display of an interleaved audio-video data, the method comprising:
  in a server for providing interleaved audio-video data to a decoder, the server configured to be communicatively coupled to an Internet Protocol (IP) network, receiving a command to switch the decoder to receiving a stream in progress, comprising a single stream of multiplexed data in which audio and video data are interleaved;
  in the server, responsively to the command, collecting audio and video data of the stream in progress;
  in the server, generating a modified single stream of interleaved audio and video data, the modified stream comprising audio and video access units of the collected data of the stream in progress, wherein a plurality of the access units are repositioned in the modified single stream of interleaved audio and video data such that an audio access unit and a video access unit that correlate in time to one another are positioned closer to one another in the modified single stream than in the stream in progress, the generating of the modified single stream further comprising discarding collected audio access units which correspond to video access units that were transmitted earlier than a beginning of the modified single stream; and
  providing the modified single stream from the server, rather than the stream in progress, to the decoder via the IP network.

2. The method as claimed in claim 1, wherein the generating of the modified single stream comprises repositioning audio access units closer to video access units that correlate in time to the repositioned audio access units.

3. The method as claimed in claim 1, wherein the generating of the modified single stream comprises repositioning video access units closer to audio access units that correlate in time to the repositioned video access units.

4. The method as claimed in claim 1, wherein providing the modified single stream to the decoder comprises providing interleaved audio-video data at a rate which is faster than a nominal rate of the interleaved audio-video data.

5. The method as claimed in claim 1, the generating of the modified single stream comprising discarding collected audio access units or video access units, by performing an action selected from the group of actions consisting of: rewriting over, silencing, and removing.

6. The method as claimed in claim 1, wherein providing the modified single stream comprises transmitting the modified single stream in a unicast mode for a determined period of time before reconnecting to a multicast service providing the stream in progress.

7. The method as claimed in claim 6, wherein transmitting the modified single stream in a unicast mode for a determined period of time comprises providing the modified single stream accelerated until the accelerated stream catches up with the multicast service.

8. A computer program product stored on a non-transitory tangible computer readable storage medium for accelerating the start of viewing an interleaved audio video stream, the computer product comprising computer useable program code which, when executed by one or more processors in a server for providing interleaved audio-video data to a decoder, the server configured to be communicatively coupled to an Internet Protocol (IP) network, cause the one or more processors to perform steps of:
  receiving a command to switch the decoder to receiving a stream in progress, comprising a single stream of multiplexed data in which audio and video data are interleaved;
  responsively to the command, collecting audio and video data of the stream in progress;
  generating a modified single stream of interleaved audio and video data, the modified single stream comprising audio and video access units of the collected data of the stream in progress, wherein a plurality of the access units are repositioned in the modified single stream of interleaved audio and video data such that an audio access unit and a video access unit that correlate in time to one another are positioned closer to one another in the modified single stream than in the stream in progress, the generating of the modified single stream comprising discarding collected audio access units which correspond to video access units that were transmitted earlier than a beginning of the modified single stream; and providing the modified single stream from the server, rather than the stream in progress, to the decoder via the IP network.

9. The computer program product as claimed in claim 8, wherein the generating of the modified single stream comprises repositioning audio access units closer to a one or more video access units located at a beginning of the modified single stream.

10. The computer program product as claimed in claim 8, wherein the discarding of the collected audio access units comprises an action selected from the group of actions consisting of: rewriting over, and silencing.

11. The computer program product as claimed in claim 8, used for switching between a first channel and a second channel of a multicast service of which the second channel transmits the stream in progress, the computer program product comprising computer usable program code for transmitting the modified single stream of the second channel in a unicast mode for a determined period of time before resuming the multicast service.

12. The computer program product as claimed in claim 11, comprising computer usable program code for providing the modified single stream of the second channel in a unicast mode until the modified single stream catches up with the stream in progress of the second channel of the multicast service.

13. A data processing system comprising:
 a processor in a server for providing interleaved audio-video data to a decoder, the server configured to be communicatively coupled to an Internet Protocol (IP) network; and
 a computer-readable storage medium, configured to be accessed by the processor, comprising a stored set of instructions for accelerating the start of viewing an interleaved audio video stream, whereby the processor is adapted to perform steps of:
  receiving a command to switch the decoder to receiving a stream in progress, comprising a single stream of multiplexed data in which audio and video data are interleaved;
  responsively to the command, collecting audio and video data of the stream in progress;
  generating a modified single stream of interleaved audio and video data, the modified single stream comprising audio and video access units of the collected data of the stream in progress, wherein a plurality of the access units are repositioned in the modified single stream of interleaved audio and video data such that an audio access unit and a video access unit that correlate in time to one another are positioned closer to one another in the modified single stream than in the stream in progress, wherein the generating of the modified single stream comprises discarding collected audio access units which correspond to video access units that were transmitted earlier than a beginning of the modified single stream; and
  providing the modified single stream from the server, rather than the stream in progress, to the decoder via the IP network.

14. The data processing system as claimed in claim 13, wherein the generating the modified single stream comprises repositioning audio access units closer to a one or more video access units located at a beginning of the modified single stream.

15. The data processing system as claimed in claim 13, wherein the discarding of the collected audio access units comprises an action selected from the group of actions consisting of: rewriting over, and silencing.

16. The data processing system as claimed in claim 13, wherein the set of instructions includes instructions to include in the modified single stream collected audio access units having unchanged timing information with respect to the stream in progress.

17. The data processing system as claimed in claim 13, for switching between a first channel and a second channel of a multicast service of which the second channel transmits the stream in progress, wherein the set of instructions includes instructions to transmit the modified single stream of the second channel in a unicast mode for a determined period of time before resuming the multicast service.

18. The data processing system as claimed in claim 17, wherein the set of instructions includes instructions to provide the modified single stream of the second channel in a unicast mode until the modified single stream catches up with the stream in progress of the second channel of the multicast service.

19. The method as claimed in claim 1, wherein the stream in progress comprises a stream in which audio units for display at respective specific times are located in the stream after video units for display after the respective specific times.

20. The method as claimed in claim 1, wherein the receiving, collecting and repositioning are performed by a channel switch server separate from the decoder.

* * * * *